UNITED STATES PATENT OFFICE.

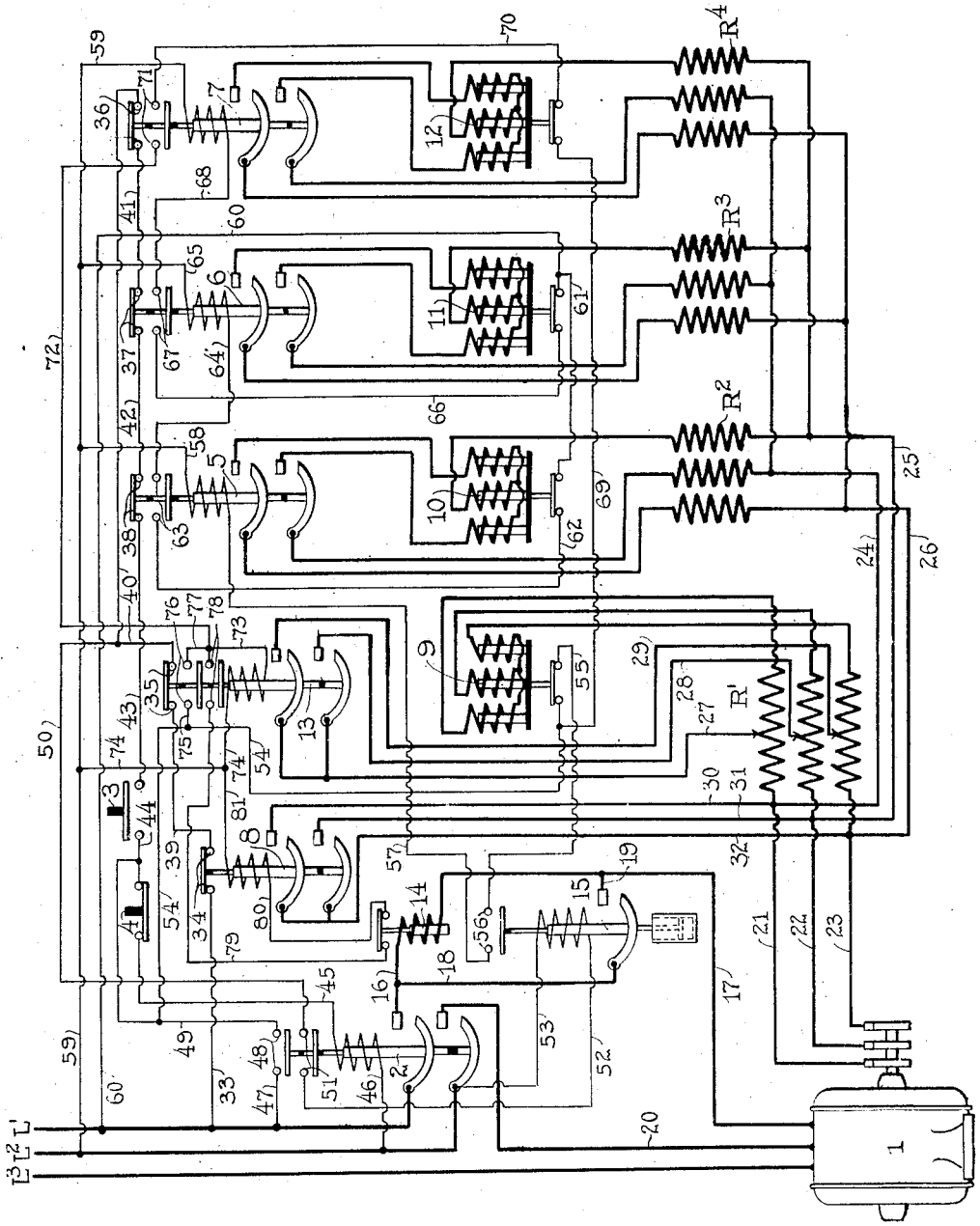

WILMAR F. LENT, OF PHILADELPHIA, PENNSYLVANIA, ASSIGNOR TO THE CUTLER-HAMMER MFG. CO., OF MILWAUKEE, WISCONSIN, A CORPORATION OF WISCONSIN.

CONTROLLER FOR ELECTRIC MOTORS.

1,260,215.  Specification of Letters Patent.  Patented Mar. 19, 1918.

Application filed March 26, 1917. Serial No. 157,459.

*To all whom it may concern:*

Be it known that I, WILMAR F. LENT, a citizen of the United States, residing at Philadelphia, in the county of Philadelphia and State of Pennsylvania, have invented new and useful Improvements in Controllers for Electric Motors, of which the following is a full, clear, concise, and exact description, reference being had to the accompanying drawing, forming a part of this specification.

This invention relates to controllers for electric motors and while applicable to controllers for both A. C. and D. C. motors, is particularly applicable to the former.

For example, a controller embodying the invention may be advantageously employed for slip regulation of an induction motor, by insertion of resistance in the rotor circuit of the motor under abnormal conditions and exclusion of such resistance upon restoration of normal conditions.

An object of the invention is to provide a controller for the aforesaid and other purposes adapted to utilize a portion of the starting resistance for subsequent regulation of the motor and where parallel resistances are employed for starting, to utilize a portion of one of such resistances for regulation.

Another object is to provide for variation of the regulating portion of resistance without affecting the use thereof for starting purposes.

Other objects and advantages will hereinafter appear.

The accompanying drawing diagrammatically illustrates an embodiment of the invention for control of an alternating current motor and the same will now be described, it being understood that the invention may be embodied in other forms for control of both A. C. and D. C. motors.

More specifically, the drawing shows an alternating current motor 1 to be supplied with current from lines $L'$, $L^2$ and $L^3$ through an electro-responsive main switch 2 controllable by starting and stopping push-buttons 3, 4, said motor being controllable through the medium of resistances $R'$, $R^2$, $R^3$ and $R^4$, each of the same having a plurality of sections for inclusion in all phases of the secondary circuit of said motor. The resistances are arranged to be progressively included in circuit n a parallel relation and to be finally short-circuited for acceleration of the motor by electro-responsive switches 5, 6, 7 and 8 which are arranged to respond progressively subject to control by series relays 9, 10, 11 and 12, each having a plurality of windings for connection in all phases of the secondary circuit.

Further, the drawing shows a resistance shunting switch 13 for limiting the amount of the resistance $R'$ to be included in the rotor circuit for slip regulation, a slip relay 14 for timing the inclusion and exclusion of said slip regulating resistance and a retarded relay 15 for controlling a short-circuit around the coil of said overload relay. Of the foregoing, the main switch, switches 5, 6, 7, 8 and 13 and relay 15 are provided with one or more sets of auxiliary contacts for governing the closing and opening of suitable maintaining and control circuits.

The circuit connections of the foregoing switches are such that upon closure of starting switch 3, main switch 2 closes for completing the motor circuit, at the same time completing a maintaining circuit for itself and closing the energizing circuit of retarded relay 15 for rendering the slip relay 14 inactive during acceleration of the motor. Closure of retarded relay 15 also completes the energizing circuit of the first accelerating switch 5, whereupon the accelerating switches 5, 6 and 7 are adapted to respond progressively, subject to delay by the respective series relays 9, 10 and 11, thereby progressively connecting the resistances $R^2$, $R^3$ and $R^4$ in parallel in the rotor circuit. Closure of accelerating switch 7 completes the circuit of resistance shunting switch 13 which responds, subject to delay by series relay 12, for limiting the portion of the resistance $R'$ to be used for subsequent slip regulation. Closure of resistance shunting switch 13 completes the circuit of accelerating switch 8 which responds for short-circuiting all phase resistance from the rotor circuit. Closure of said switch 13 also completes a maintaining circuit for itself and for switch 8 independent of switch 7 and interrupts the closing circuit of retarded relay 15. Said relay thereafter opens, subject to dash-pot retardation, for rendering the slip relay 14 sensitive to overloads, and also interrupting the energizing circuit of switch 5, whereupon switches 5, 6 and 7 open progressively.

Upon the occurrence of an overload in the primary circuit, slip relay 14 responds for interrupting the maintaining circuit of switch 8. Said switch thereupon opens for interrupting the short-circuit around the starting resistance R', thus including in the rotor circuit the portions of said resistance which were previously determined through closure of resistance shunting switch 13. Upon restoration of normal current conditions, relay 14 closes for again short-circuiting said resistance through closure of switch 8.

The above mentioned power circuits may be described as follows: Line L' is connected through the main switch by conductor 16 through the winding of slip relay 14, thence by conductor 17 to the motor. Said winding is arranged to be shunted through conductors 18 and 19 upon closure of relay 15. Line L² is connected through the main switch, by conductor 20 to the motor, while line L³ is permanently connected to the motor. The secondary lines 21, 22 and 23 extend through the respective phase sections of starting resistance R', through the respective phase windings of series relay 9, being interconnected therebeyond. The resistances R², R³ and R⁴ are included in parallel branches of the rotor circuit, being connected through common conductors 24, 25 and 26 to the secondary lines 21, 22 and 23 at a point in advance of resistance R'. The windings of series relays 10, 11 and 12 are also included in the branch circuits, said circuits being normally open and adapted to be closed by accelerating switches 5, 6 and 7. The contacts of said series relays are arranged to remain closed during normal conditions.

Closure of resistance shunting switch 13 serves to short-circuit through conductors 27, 28 and 29 a portion of each phase section of resistance R', leaving the balance thereof for subsequent slip regulation, the value of the latter being determinable at will. Closure of accelerating switch 8 connects conductors 30, 31 and 32 for shunting all secondary resistance.

The control circuits may be traced as follows: The main switch energizing circuit is from line L' by conductor 33 through the down contacts 34, 35, 36, 37 and 38 of the respective switches 8, 13, 7, 6 and 5, said contacts being respectively connected through conductors 39, 40, 41 and 42, thence by conductor 43 through starting switch 3, by conductor 44 through stopping switch 4, by conductor 45 through the winding of said main switch, and by conductor 46 to line L². The main switch maintaining circuit is from line L' by conductor 47 through the first set of up contacts 48 of said main switch, by conductors 49 and 44 through stopping switch 4, thence through the winding of said main switch to line L² as above traced. Upon closure of said circuit, release of starting switch 3 is ineffective to stop the motor.

The energizing circuit of retarded relay 15 is from line L' by conductor 33 through the down contacts of switch 8, by conductor 39 through the down contacts of switch 13, thence by conductors 40 and 50 through the second set of up contacts 51 of the main switch thence by conductor 52 through the winding of said relay 15 and by conductor 53 to line L². The energizing circuit of accelerating switch 5 is from line L' by conductor 47 through the first set of up contacts of the main switch and by conductors 49 and 54 through series relay 9, thence by conductor 55 through the up contacts 56 of relay 15, by conductor 57 through the winding of said accelerating switch 5 and by conductors 58 and 59 to line L². The energizing circuit of accelerating switch 6 is from line L' by conductors 60 and 61 through series relay 10, by conductor 62 through the up contacts 63 of switch 5, thence by conductor 64 through the winding of said accelerating switch 6 and by conductors 65 and 59 to line L². The energizing circuit of accelerating switch 7 is from line L' by conductor 60, through series relay 11, and by conductor 66 through the up contacts 67 of switch 6, thence by conductor 68 through the winding of said accelerating switch and by conductor 59 to line L². The energizing circuit of resistance shunting switch 13 is from line L' through the first set of up contacts of the main switch, by conductor 54 as previously traced, and by conductor 69 through series relay 12, thence by conductor 70 through the up contacts 71 of switch 7 and by conductors 72 and 73 through the windings of said switch 13, thence by conductors 74 and 59 to line L². The maintaining circuit of said switch which is completed upon closure thereof is from line L' to conductor 54, as last traced, thence by conductor 75 through the first up contacts 76 of said switch 13, by conductors 77 and 73 through the winding of said switch to line L² as previously traced. The energizing circuit of accelerating switch 8 is from line L' to conductor 72, as previously traced, thence through the second set of up contacts 78 of switch 13 and by conductor 79 through slip relay 14, thence by conductor 80 through the winding of said accelerating switch 8 and by conductors 81, 74 and 59 to line L².

Obviously the maintaining circuit of switch 13 serves also for the switch 8, whereby both are retained closed irrespective of opening of switch 7. The circuit of retarded relay 15 being through the down contacts of switch 13, said relay is deënergized upon and during closure of said switch, however, owing to dash-pot retardation, relay 15 does not open until after closure of switch 8 and subsiding of the surges of current due to acceleration. In practice the dash-pot is arranged to retard only the opening of said relay. The slip relay 14 controls the winding of switch 8 only, switch 13 remaining closed during running of the motor.

Stopping of the motor is effected by opening stopping switch 4. The circuit of starting switch 3 being through the down contacts of switches 8, 13, 7, 6 and 5, said starting switch is inactive for starting the motor so long as any of said switches remains closed.

What I claim as new and desire to secure by Letters Patent is:

1. In a motor controller, in combination, a plurality of resistances and means for progressively paralleling and short-circuiting said resistances for acceleration and thereafter reincluding in circuit a limited portion of one of said resistances for regulation.

2. In a motor controller, in combination, a plurality of resistances, means for progressively paralleling and short-circuiting said resistances for acceleration and other means for partially short-circuiting one of said resistances whereby the remaining portion thereof may be reincluded in circuit by said first mentioned means for speed regulation.

3. In a motor controller, in combination, a plurality of resistances, means for progressively paralleling and short-circuiting said resistances for acceleration, means for partially short-circuiting one of said resistances whereby the remaining portion thereof may be reincluded in circuit by said first mentioned means for speed regulation, and means operative automatically under predetermined conditions for effecting such operation of said first mentioned means.

4. In a motor controller, in combination, a plurality of resistances, means for paralleling and finally short-circuiting said resistances for motor acceleration, means for short-circuiting a predetermined portion of one of said resistances whereby the remaining portion thereof may be reincluded in circuit by said first mentioned means for speed regulation, the value of said portion being variable at will, and means operative automatically under predetermined conditions for effecting such operation of said first mentioned means.

5. In a motor controller, in combination, a plurality of fixed resistance sections, electro-responsive means for progressively paralleling and finally short-circuiting said sections for motor acceleration and thereafter reincluding in circuit a limited portion of one of said sections for regulation.

6. In a motor controller, in combination, a plurality of resistances, means for paralleling and finally short-circuiting said resistances for motor acceleration, means for short-circuiting a predetermined portion of one of said resistances whereby the remaining portion thereof may be reincluded in circuit by said first mentioned means for speed regulation, the value of said portion being variable at will, means operative automatically under predetermined conditions for effecting such operation of said first mentioned means and means rendering said last named means ineffective during acceleration of the motor through said first named means.

7. In a motor controller, in combination, a plurality of fixed resistances, electro-responsive means for progressively paralleling and finally short-circuiting said resistances for motor acceleration, other electro-responsive means for partially short-circuiting one of said resistances whereby the remaining portion thereof may be reincluded in circuit by said first mentioned means, electro-responsive means operative under predetermined conditions to effect such operation of said first mentioned means for speed regulation, and electro-responsive means operative to render said last mentioned means inactive during motor acceleration through said first mentioned means.

8. In a motor controller, in combination, a plurality of resistances, electro-responsive means for progressively paralleling and finally short-circuiting said resistances for motor acceleration, an electro-responsive switch for partially short-circuiting one of said resistances whereby the remaining portion thereof may be reincluded in circuit by said first mentioned means, means operative under predetermined conditions to effect such operation of said first mentioned means for speed regulation, and means rendering said last mentioned means ineffective prior to closure of said switch and for a predetermined period thereafter.

In witness whereof, I have hereunto subscribed my name.

WILMAR F. LENT.